United States Patent [19]

Semersky et al.

[11] Patent Number: 5,482,170
[45] Date of Patent: Jan. 9, 1996

[54] MULTI-CHAMBER CONTAINERS

[75] Inventors: Frank E. Semersky; Daniel J. Durham, both of Toledo, Ohio

[73] Assignee: Plastic Technologies, Inc., Holland, Ohio

[21] Appl. No.: 339,940

[22] Filed: Nov. 15, 1994

[51] Int. Cl.$^6$ .................................................. B65D 1/04
[52] U.S. Cl. ................................................ 215/6; 220/555
[58] Field of Search ................................... 215/6; 220/555

[56] References Cited

U.S. PATENT DOCUMENTS

| | | |
|---|---|---|
| 3,598,270 | 8/1971 | Adomaitis et al. . |
| 3,881,621 | 5/1975 | Adomaitis . |
| 3,935,955 | 2/1976 | Das . |
| 4,368,825 | 1/1983 | Motill . |
| 4,785,949 | 11/1988 | Krishnakumar et al. . |
| 4,889,255 | 12/1989 | Schiemann ............................... 215/6 X |
| 5,154,917 | 10/1992 | Ibrahim et al. ........................... 215/6 X |
| 5,158,191 | 10/1992 | Douglas et al. . |
| 5,232,108 | 8/1993 | Nakamura ..................................... 215/6 |
| 5,232,108 | 8/1993 | Nakamura . |
| 5,242,066 | 9/1993 | Kelsey . |
| 5,318,787 | 6/1994 | Branner et al. ........................... 215/6 X |
| 5,398,828 | 3/1995 | Valyi ........................................ 215/6 X |

FOREIGN PATENT DOCUMENTS 11430 of 1968 Japan .

Primary Examiner—Steven M. Pollard
Attorney, Agent, or Firm—Donald R. Fraser

[57] ABSTRACT

Multi-chamber containers are disclosed having at least a central web dividing the container into discrete chambers. A base for the container is provided which is generally outwardly convex having an inwardly arched lineal impression in the region of the juncture between the central web and the base. Outwardly extending foot portions in the base on either side of the lineal impression providing impact support for the container.

7 Claims, 3 Drawing Sheets

U.S. Patent    Jan. 9, 1996    Sheet 1 of 3    5,482,170
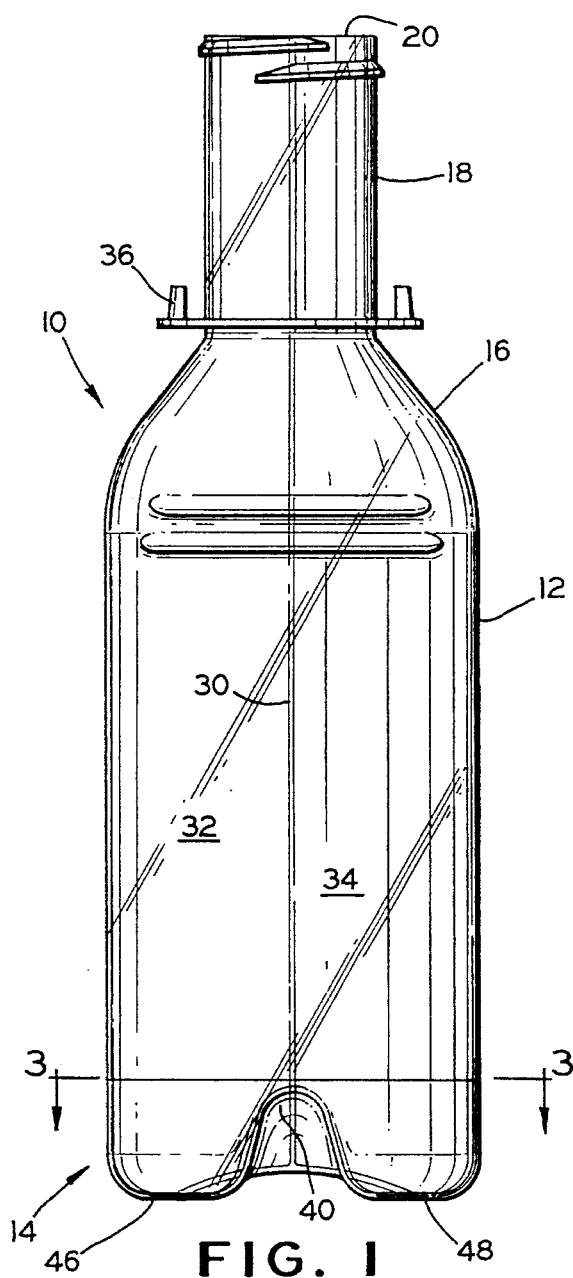
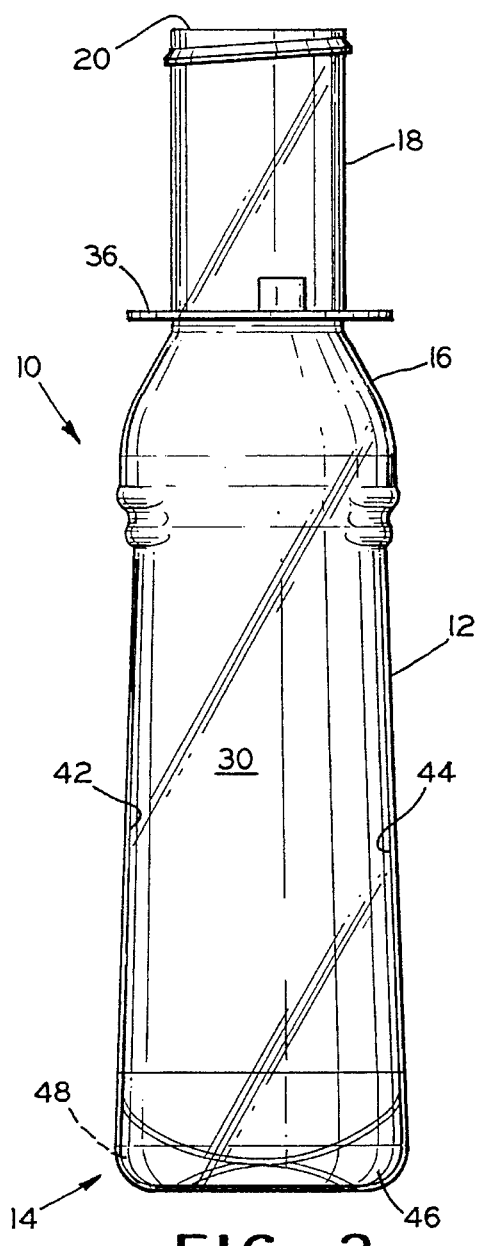
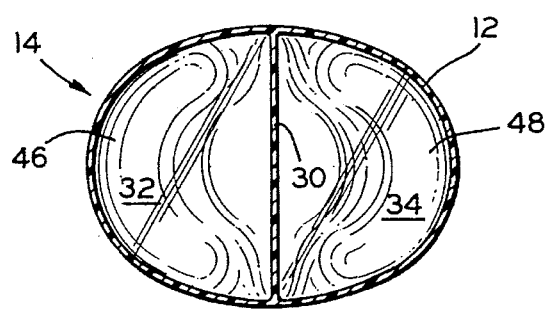
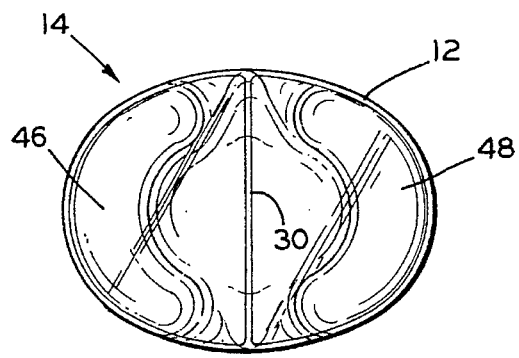
FIG. 1
FIG. 2
FIG. 3
FIG. 4

MULTI-CHAMBER CONTAINERS

BACKGROUND OF THE INVENTION

1. Field of the Invention

The present invention relates to blow molded multi-chamber dispensing containers. More particularly, the invention relates to a footed base for multi-chamber containers.

2. Description of the Prior Art

There are generally two types of multi-chamber containers. The first type includes separate containers interfitted together or held together with a shrink band or alternate attachment means. A multi-chamber container of this type is disclosed in U.S. Pat. No. 5,158,191 wherein there is disclosed two bottles held together with an interfitting arrangement. Whether the bottles are interfitted together or held together with a shrink band there is a resultant and inherent lack of stability. There always will be some inter-container relative movement. The second and most preferred type container is one comprised of multiple chambers as a part of a basic structure. The most effective way to form such containers is by blow molding. However, it is difficult to produce multi-chambered containers by blow molding. Techniques for blow molding multi-chamber containers are disclosed in Japanese Application No. 11430/1968, as well as in U.S. Pat. No. 5,232,108 and U.S. Pat. No. 5,242,066. Japanese Application No. 11430/1968 discloses injection molding a preform having a center wall and then blowing this preform to a container with two compartments. The resultant container can be round or elliptical. U.S. Pat. No. 5,232,108 discloses a round multi-chamber container which has been blown from a preform having multiple chambers. The patent discloses a technique for maintaining the integrity of the center wall during the blow molding phase. U.S. Pat. No. 5,242,066 discloses plastic bottles having internal reinforcing spiders or webs. The wall of the bottle is designed to contain a carbonated beverage requiring a reinforced wall. The spiders or webs usually do not extend fully from the bottom of the bottle to the bottle exit since there is no need to keep the liquid portions separate. The liquid throughout the bottle is the same.

The preferred multi-chamber container is one that is made in one piece to form an integral structure. Such a container costs less to produce and to fill. It also has more structural integrity. However, it is difficult to blow mold multi-chamber containers, and in particular multi-chamber containers which have other than a round shape. Also it is difficult to blow mold a multi-chamber container which includes an integral dispensing arrangement where the fluids from each chamber of the containers do not mix until caused to flow from the container into a receptacle.

Attempts have been made to overcome the problems of the prior art and produce multi-chamber dispensing and dosing containers of an integral structure. Such containers may be blow-molded from an injected preform with assembly only including the insertion of delivery dip tube fitments and the provision of a closure. The resultant multi-chamber container is easily filled and has full structural integrity during storage, handling and use.

However, it has been found that due to the inherent structure should such multi-chambered containers drop and impact a surface, failures may occur. The failures include lifting and separation of the dividing web at the juncture thereof with the base of the container.

SUMMARY OF THE INVENTION

The present invention is directed to a base for a multi-chamber dispensing and dosing containers which are of an integral one-piece construction. The multi-chamber container is blow molded and is provided with at least two separate chambers. The chambers are typically formed by a web which is adapted to extend from the base of the container to a region adjacent the dispensing portion.

It is an object of the invention to produce a multi-chamber dispensing and dosing container having a base which is formed to protect the dividing web from lifting in the region of the juncture between the web and the base.

Another object of the invention is to produce a multi-chamber dispensing and dosing container having a petaloid base configuration including energy absorbing feet adjacent the juncture of a dividing web and the base.

The above and other objects of the invention are typically achieved by a multi-chamber container having a base and at least one internal web forming separate chambers in the container, the base comprising a generally outwardly convex bottom wall having an axial inwardly arched lineal impression the under surface of which forms a juncture web the bottommost edge of the internal web dividing the interior of the container into separate chambers, and at least a pair of outwardly extending footed portions providing impact support for the container.

Further objects and advantages of this invention will be apparent from the following description and appended claims, reference being made to the accompanying drawings forming a part of the specification, wherein like reference characters designate corresponding parts in the several views.

BRIEF DESCRIPTION OF THE DRAWINGS

The above objects and advantages of the invention will become readily manifest to those skilled in the art from reading the following detailed description of the preferred embodiment of the invention when considered in the light of the accompanying drawings in which:

FIG. 1 is a front and rear elevational view of a container embodying the features of the invention illustrating a two-footed support therefor;

FIG. 2 is a left and right side elevational view thereof;

FIG. 3 is a sectional view taken along line 3—3 of FIG. 1;

FIG. 4 is a bottom plan view of the embodiment illustrated in FIGS. 1, 2, and 3;

DESCRIPTION OF THE PREFERRED EMBODIMENTS

Figure 5:
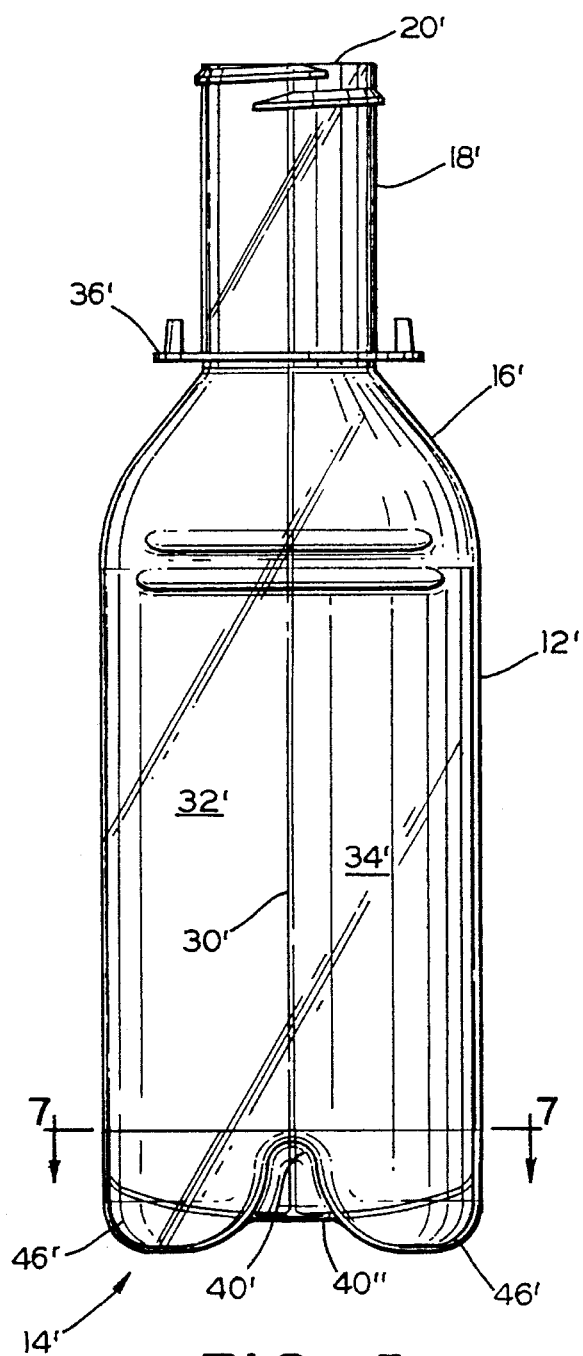
FIG. 5 is a front and rear elevational view of a container embodying the features of the invention illustrating a four-footed support therefor.

With reference to the embodiment illustrated in FIGS. 1 through 4, there is shown a container 10 having a sidewall 12, a base 14, a sidewall shoulder 16, a neck portion 18, and an aperture 20.

A web 30 is disposed within the interior of the container 10 and is adapted to extend upwardly from the base 14 traversing the sidewall 12, the sidewall shoulder 16, the neck 18 and terminates at the aperture 20. The web 30 effectively divides the interior of the container 10 into two discrete chambers 32 and 34.

The upper end of the container 10 is provided with a locking ring 36 and typically will include a suitable closure, not shown, to cooperate with the locking ring 36 to effectively close the container 10.

The base 14 is generally outwardly convex in shape and is provided with an axial inwardly arched lineal impression 40, the inner surface of which forms a juncture with the bottommost edge of the internal web 30. It will be readily apparent that the opposing side edges 42 and 44 are integrally joined with the inner surface of the sidewall 12, the sidewall shoulder 16, and the neck portion 18. The interior of the container 10 is thereby formed into the chambers 32 and 34 and separately communicate with the exterior of the container 10 through the aperture 20.

On opposite sides of the lineal impression 40 there is formed a pair of opposed outwardly extending petaloid footed portions 46 and 48. The footed portions 46 and 48 normally provide support for the container 10 and further provide impact protection for the lineal juncture between the bottommost edge of the central web 30 and the base 14.

It will be appreciated should the container 10 filled with separate liquids, for example, be accidentally allowed to drop on a hard surface, the footed portions 46 and 48 will function to protect the juncture of the web 30 and the base 14 from direct impact and the possible resultant lifting and separation of the edge of the web 30 from the base 14 which would allow the otherwise discrete liquids to mix.

Further, it will be understood favorable results have been achieved by forming the container 10 of polyethylene terephthalate (PET), for example. Such plastic material may be formulated to allow the plastic material which defines the footed portions 46 and 48 to absorb impact energy at a given rate to prevent any lifting of the central web 30 from the base 14.

Figure 6:
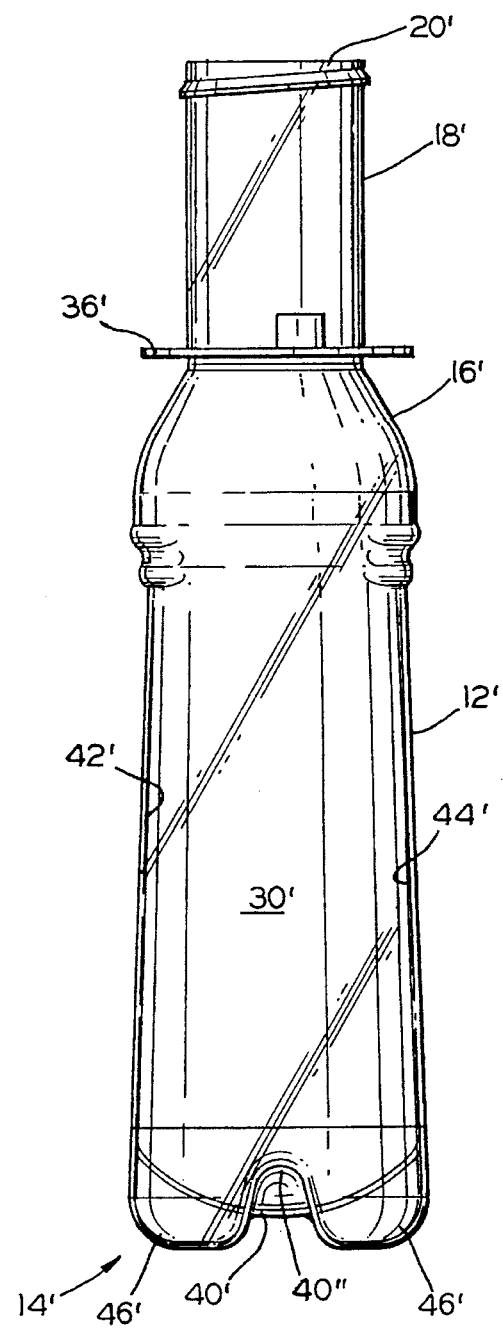
FIG. 6 is a left and right side elevational view of the embodiment illustrated in FIG. 5.
Figure 7:
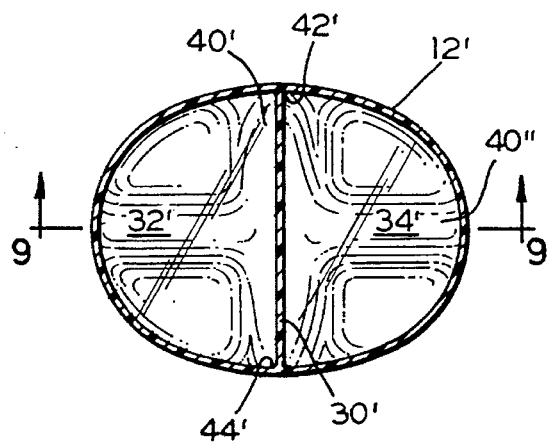
FIG. 7 is a sectional view taken along line 7—7 of FIG. 5.
Figure 8:
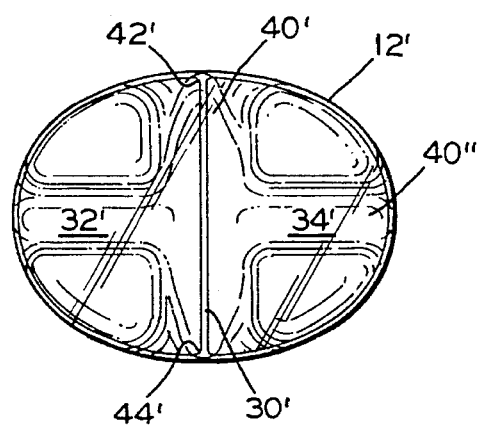
FIG. 8 is a bottom plan view thereof.
Figure 9:
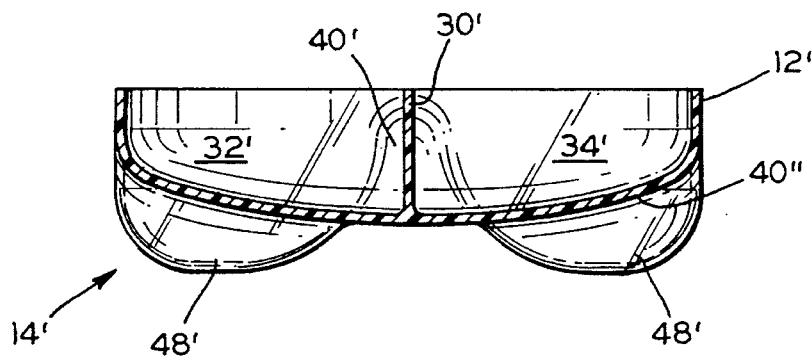
FIG. 9 is a sectional view taken along line 9—9 of FIG. 7.

Another embodiment of the invention is illustrated in FIGS. 5 through 9. The embodiment is very similar to the embodiment of the invention illustrated in FIGS. 1 through 4 and primed references are used to illustrate structural elements which are the same as those illustrated in FIGS. 5 through 9. The container 10' has a base 14' which is generally outwardly convex in shape similar to the earlier described embodiment but is provided with a petaloid configuration having a four-footed support rather than the two-footed support described hereinbefore.

More specifically, the base 14' of the container 10' is provided with an axial inwardly arched lineal impression 40' and a generally laterally disposed axial inwardly arched lineal impression 40". The resultant base structure includes spaced apart footed portions 46' and 48' disposed on opposite sides of the impression 40', and spaced apart footed portions 50 and 52 disposed on opposite sides of the impression 40". It has been found that under certain circumstances, the four-footed structure of FIGS. 5 through 9 has additional inherent stability and resistance to tipping.

It has been found that the container described hereinbefore may be manufactured by a blow molding process wherein a preform is formed by heating the plastic material so that it flows and thence applying a melt pressure of from about 2000 to 20,000 psi. Thereafter the preform is placed in a blow mold and is blown to the shape of the mold by an internal fluid pressure of about 100 to 1,000 psi.

While mention has been made that satisfactory results have been achieved by utilizing polyethylene terephthalate, it will be understood that copolymers or terpolymers thereof may likewise be used. Also, other useful plastic materials include polypropylene, polyvinyl chloride, acrylonitrile, styrene or copolymers thereof, polyethylene napthalate, and polybutylene terephthalate.

In accordance with the provisions of the patent statues, the present invention has been described in what is presently considered to represent its preferred embodiment. However, it should be understood that the invention can be practiced otherwise than as specifically illustrated and described without departing from its spirit or scope.

What is claimed is:

1. In a multi-chamber container having a base, outlet aperture, a sidewall joining the base and the aperture, and at least one integral web disposed within the container and extending from the base to the aperture forming separate chambers in the container, the web constituting a substantial portion of each chamber, the improvement comprising:

the base having a generally outward convex bottom wall, an axial inwardly arched lineal impression in said base, the inner surface of said base in the region of the lineal impression forming a juncture with the bottommost edge of the web thereby dividing the interior of the container into separate chambers, each of the chambers communicating with the outlet aperture; and outwardly extending footed positions providing impact support for the container.

2. In a multi-chamber container having a base, outlet aperture, a sidewall joining the base and the aperture, and at least one integral web disposed within the container and extending from the base to the aperture forming separate chambers in the container, the web constituting a substantial portion of each chamber, the improvement comprising:

the base having a generally outward convex bottom wall, a first axial inwardly arched lineal impression in said base, the inner surface of said base in the region of the lineal impression forming a juncture with the bottommost edge of the web thereby dividing the interior of the container into separate chambers, each of the chambers communicating with the outlet aperture; and outwardly extending footed portions disposed on opposite sides of the lineal impression formed in said base.

3. The invention defined in claim 1 wherein said footed portions are formed of energy absorbing material.

4. The invention defined in claim 3 wherein said energy absorbing material is polyethylene terephthalate.

5. The invention defined in claim 4 wherein at least four outwardly extending footed portions are formed.

6. The invention defined in claim 2 wherein said outwardly extending footed portions include at least one footed portion on opposite sides of the lineal impression formed in said base.

7. The invention defined in claim 2 including a second axial inwardly arched lineal impression in said base at an angle to said first axial inwardly arched lineal impression.

\* \* \* \* \*